US012326686B2

(12) United States Patent
Haruta

(10) Patent No.: US 12,326,686 B2
(45) Date of Patent: Jun. 10, 2025

(54) IMAGE FORMING APPARATUS WITH EXPOSURE HEAD POSITIONING STRUCTURE

(71) Applicant: BROTHER KOGYO KABUSHIKI KAISHA, Nagoya (JP)

(72) Inventor: Kotaro Haruta, Gifu (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 133 days.

(21) Appl. No.: 18/186,384

(22) Filed: Mar. 20, 2023

(65) Prior Publication Data

US 2023/0315003 A1 Oct. 5, 2023

(30) Foreign Application Priority Data

Apr. 1, 2022 (JP) ................................ 2022-061945

(51) Int. Cl.

*G03G 21/16* (2006.01)
*G03G 15/04* (2006.01)
*G03G 21/18* (2006.01)

(52) U.S. Cl.

CPC ... *G03G 21/1666* (2013.01); *G03G 15/04054* (2013.01); *G03G 21/1647* (2013.01); *G03G 21/1671* (2013.01); *G03G 21/1842* (2013.01)

(58) Field of Classification Search

CPC ........... G03G 21/1666; G03G 21/1647; G03G 21/1842

See application file for complete search history.

(56) References Cited

U.S. PATENT DOCUMENTS

| | | | | |
|---|---|---|---|---|
| 8,918,018 | B2 * | 12/2014 | Wei | G03G 21/1666 399/118 |
| 9,632,478 | B2 * | 4/2017 | Sugiyama | G03G 21/1647 |
| 10,061,224 | B1 * | 8/2018 | Hwang | G03G 21/1666 |
| 2009/0169261 | A1 | 7/2009 | Yokoi | |
| 2009/0220272 | A1 | 9/2009 | Mikami et al. | |
| 2018/0173133 | A1 | 6/2018 | Tsukada | |
| 2021/0311408 | A1 | 10/2021 | Hiraoka et al. | |

FOREIGN PATENT DOCUMENTS

| | | | |
|---|---|---|---|
| JP | H09-174919 | A | 7/1997 |
| JP | 2009-12281 | A | 1/2009 |
| JP | 2009-157142 | A | 7/2009 |
| JP | 2009-208295 | A | 9/2009 |
| JP | 2018-97238 | A | 6/2018 |
| JP | 2021-162745 | A | 10/2021 |

* cited by examiner

*Primary Examiner* — Arlene Heredia

(74) *Attorney, Agent, or Firm* — Merchant & Gould P.C.

(57) ABSTRACT

An image forming apparatus, having a housing, a photosensitive drum, an exposure head, and a positioning piece, is provided. The housing has a boss. The photosensitive drum is configured to be accommodated in the housing. The exposure head is configured to expose the photosensitive drum and is movable between an exposable position, at which the exposure head exposes the photosensitive drum, and a retracted position, at which the exposure head is separated farther from the photosensitive drum than the exposable position. The positioning piece is configured to locate the exposure head at a predetermined position in the housing. The positioning piece has a cylinder fitted around the boss and an arc surface extending concentrically with a circumferential surface of the cylinder. The arc surface is configured to contact the exposure head.

10 Claims, 16 Drawing Sheets

IMAGE FORMING APPARATUS WITH EXPOSURE HEAD POSITIONING STRUCTURE

REFERENCE TO RELATED APPLICATIONS

This application claims priority from Japanese Patent Application No. 2022-061945 filed on Apr. 1, 2022. The entire content of the priority application is incorporated herein by reference.

BACKGROUND ART

An image forming apparatus having a main housing, a plurality of exposure head, and a plurality of process cartridges, is known. The exposure heads may each have LEDs at a tip end thereof. The process cartridges may each have a developing cartridge and are attachable to the main housing. The main housing may have grooves, by which correct positions in a sub-scanning direction for the exposure heads being in respective exposable positions are defined, and positioning members, by which the exposure heads inserted in the grooves may be located at the correct positions.

DESCRIPTION

In the known image forming apparatus, however, when the positioning members are displaced in the main housing, the exposure heads may not be located at the correct positions in the main housing, and accuracy for locating the exposure heads at the correct positions may be lowered.

The present disclosure is advantageous in that an image forming apparatus, in which accuracy for positioning exposure heads at correct positions is maintainable, is provided.

Next, an embodiment of the present disclosure will be described below with reference to the accompanying drawings.

[Overall Configuration of Image Forming Apparatus]

Figure 1:
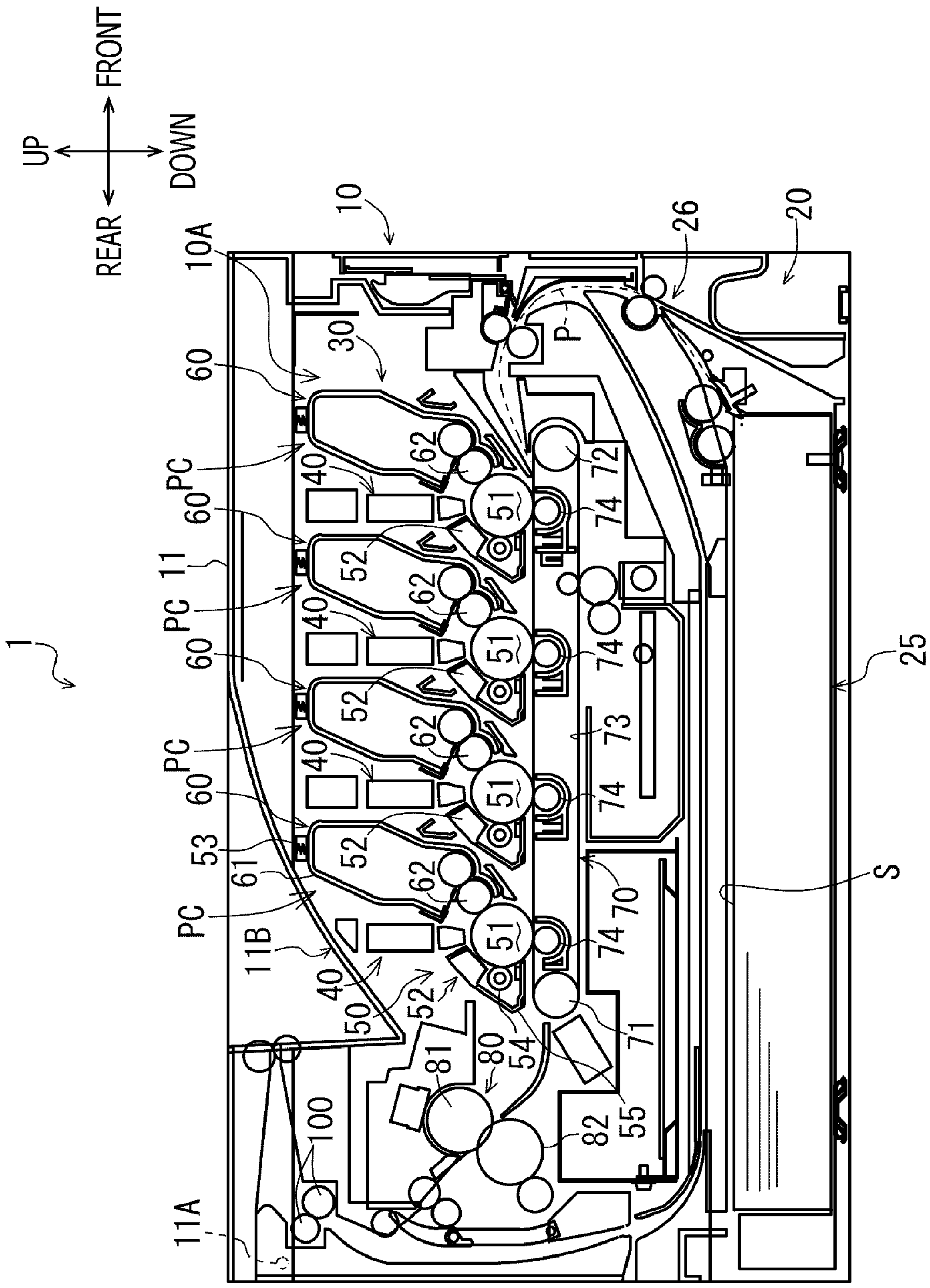
FIG. 1 is a cross-sectional view of an image forming apparatus.

An image forming apparatus 1 shown in FIG. 1 is a multicolor laser printer capable of forming images in multiple colors on sheets S electro-photographically.

In the following description, based on a posture of the image forming apparatus 1 situated on a horizontal plane, a right-hand side and a left-hand side in FIG. 1 to a viewer will be defined as a front side and a rear side, respectively, of the image forming apparatus 1. A left-hand side and a right-hand side to a user who stands in front of the image forming apparatus 1 will be defined as a leftward side and a rightward side, respectively, of the image forming apparatus 1. In other words, a nearer side and a farther side to the viewer with respect to a cross section in FIG. 1 will be defined as the leftward side and the rightward side, respectively, of the image forming apparatus 1. A front-to-rear or rear-to-front direction may be called a front-rear direction, a left-to-right or right-to-left direction may be called a widthwise direction, and an up-to-down or down-to-up direction may be called a vertical direction.

As shown in FIG. 1, the image forming apparatus 1 has a main housing 10 and a cover 11. Moreover, the image forming apparatus 1 has a feeder 20 and an image forming device 30 arranged inside the main housing 10.

The cover 11 is located on a side of exposure heads 40 opposite to a side on which the photosensitive drums 51 are arranged in the vertical direction. In particular, the cover 11 may be located on an upper side of the main housing 10. The cover 11 is pivotably supported by the main housing 10 to pivot on a pivot axis 11A. Th cover 11 may pivot to open or close an opening 10A formed on the upper side of the main housing 10. In particular, the cover 11 may pivot on the pivot axis 11A, which is located on one side of the photosensitive drums 51 in the front-rear direction, e.g., rearward, apart from the photosensitive drums 51 and extends in parallel with the widthwise direction. In this arrangement, the cover 11 may pivot between a closed position, at which the cover 11 closes the opening 10A, and an open position, at which the cover 11 exposes the opening 10A.

The feeder 20 is located in a lower area in the main housing 10 and includes a feeder tray 25 to store sheets S and a sheet-feeding assembly 26 for feeding the sheets S to the image forming device 30. The sheets S in the feeder tray 25 may be separated from one another and fed to the image forming device 30 by the sheet-feeding assembly 26. Inside the main housing 10, a conveyer path P for the sheets S to travel from the feeder tray 25 through the image forming device 30 to an ejection tray 11B is arranged.

The image forming device 30 includes four (4) exposure heads 40, four (4) process cartridges PC, a transfer unit 70, and a fuser unit 80.

Each of the exposure heads 40 has a plurality of LEDs at a tip end thereof and may be supported by the cover 11 in a posture hanging down from the cover 11. The exposure heads 40 are arranged at upper positions with respect to the photosensitive drums 51 to face the photosensitive drums 51 when the cover 11 is at the closed position. In particular, the exposure heads 40 may move between respective exposable positions, at which the exposure heads 40 may expose the photosensitive drums 51, and retracted positions, at which the exposure heads 40 are apart farther from the photosensitive drums 51 than the exposable positions, along with the cover 11 moving between the closed position and the open position. The exposure heads 40 may irradiate surfaces of the photosensitive drums 51 with the LEDs flashing on and off according to image data. The exposure heads 40 will be described further below in detail.

Figure 2:
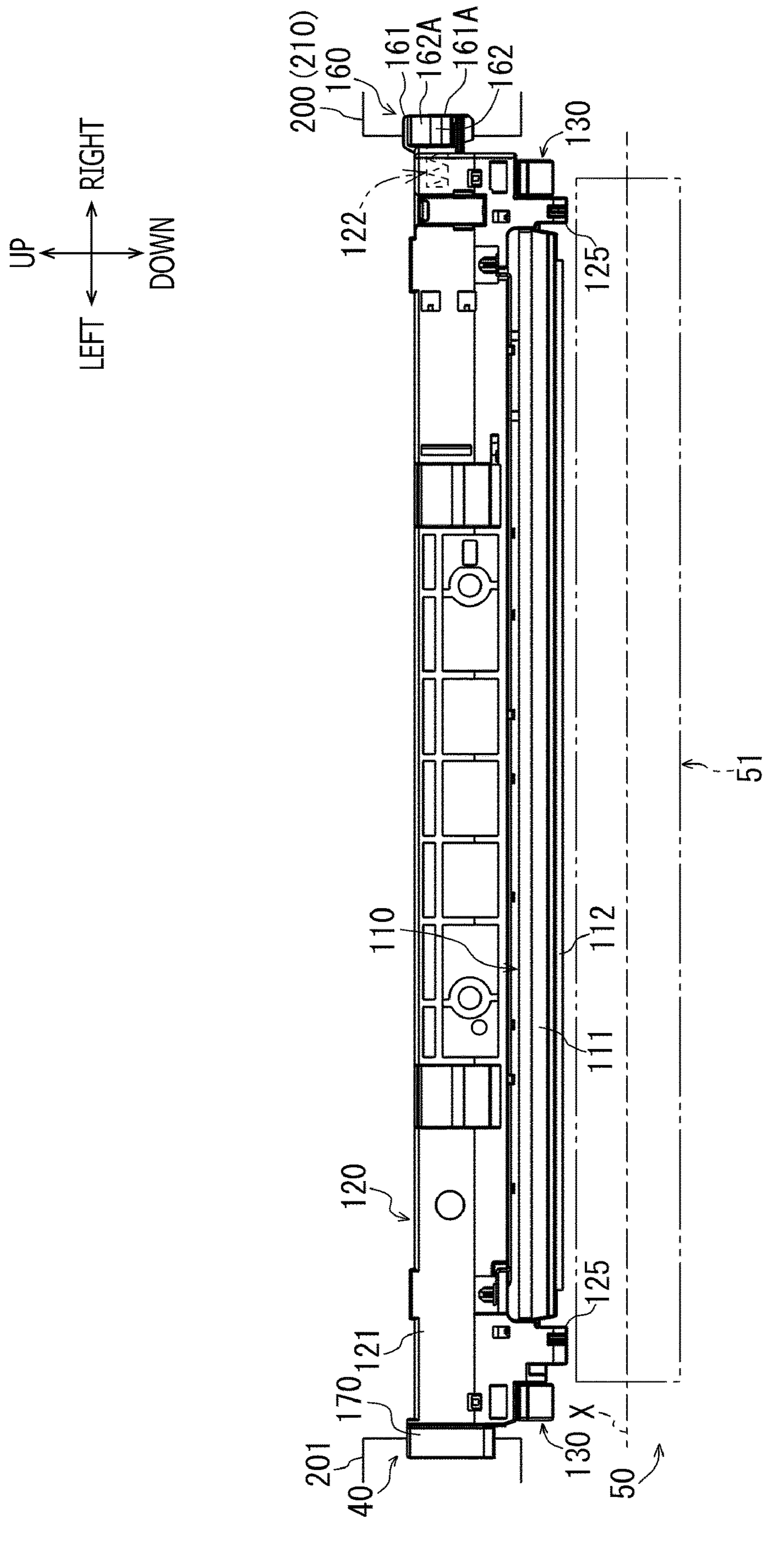
FIG. 2 is a front view of an exposure head located at an exposable position and a process cartridge.

The main housing 10 includes a side frame 200 on the right and a side frame 201 on the left, as shown in FIG. 2, which are spaced apart from each other in the widthwise direction. The side frame 200 on the right is located on a rightward end of the main housing 10 and spreads in the front-rear direction and the vertical direction. The side frame 201 on the left is located on a leftward end of the main housing 10 and spreads in the front-rear direction and the vertical direction.

The process cartridges PC are arranged between the side frame 200 on the right and the side frame 201 on the left and are removably supported by the side frames 200 and the side frame 201. In other words, the process cartridges PC are detachably attached to and accommodated in the main housing 10. The side frame 200 is located rightward from the process cartridges PC and may support rightward ends of the process cartridges PC.

The side frame 201 is located leftward from the process cartridges PC and may support leftward ends of the process cartridges PC. The four process cartridges PC are provided to correspond on one-to-one basis to four colors of black, yellow, magenta, and cyan.

The process cartridges PC are arranged to align in the front-rear direction in an area between the cover 11 and the feeder tray 25. The process cartridges PC are attachable to the main housing 10 through the opening 10A when the cover 11 is open. Each process cartridge PC has a drum unit 50 and a developing cartridge 60 detachably attachable to the drum unit 50.

The drum unit 50 includes a photosensitive drum 51 in a cylindrical form, a charger 52 for charging the photosensitive drum 51, a pressing spring 53 which urges the developing cartridge 60 toward the photosensitive drum 51, a cleaning roller 54, and a drum frame 55 which supports the photosensitive drum 51.

The cleaning roller 54 may remove toner and other interfering materials from the photosensitive drum 51. The cleaning roller 54 is in contact with the photosensitive drum 51 and is rotatable with the photosensitive drum 51.

The developing cartridge 60 includes a toner container 61 for containing toner and a developing roller 62 for supplying the toner in the toner container 61 to the photosensitive drum 51.

The transfer unit 70 is located between the feeder tray 25 and the process cartridges PC. The transfer unit 70 includes a driving roller 71, a driven roller 72, a conveyer belt 73 being an endless belt strained around the driving roller 71 and the driven roller 72, and four (4) transfer rollers 74. The conveyer belt 73 is arranged such that an outer upper surface thereof contacts the photosensitive drums 51 and is nipped between the transfer rollers 74, which are located on an inner side of the conveyer belt 73, and the photosensitive drums 51.

The fuser unit 80 is located rearward from the process cartridges PC and the transfer unit 70. The fuser unit 80 includes a heat roller 81 and a pressure roller 82, which is located to face the heat roller 81 and pressed against the heat roller 81.

In the image forming device 30, the surfaces of the photosensitive drums 51 may be charged evenly by the chargers 52 and may be irradiated by the exposure heads 40 selectively, and thereby electrostatic latent images based on image data may be formed on the photosensitive drums 51. The developing rollers 62 may supply toners to the photosensitive drums 51, and thereby the electrostatic latent image may be visualized to form toner images on the photosensitive drums 51.

The toner images formed on the photosensitive drums 51 may be transferred in layers by the transfer rollers 74 onto the sheet S being conveyed on the conveyer belt 73 one after another. The sheet S with the toner images transferred thereon may be conveyed through a position between the heat roller 81 and the pressure roller 82, and thereby the toner images may be thermally fixed to the sheet S. The sheet S may be conveyed by conveyer rollers 100 to be ejected outside the housing 10 and rest on an ejection tray 11B formed on the upper side of the cover 11.

[Exposure Heads]

Next, configuration of the exposure heads 40 and surroundings will be described. As shown in FIG. 2, a rotation axis X of each photosensitive drum 51 extend in the widthwise direction. In the following paragraphs, the extending direction of the rotation axis X, i.e., the widthwise direction, may be called as an "axial direction."

Figure 3:
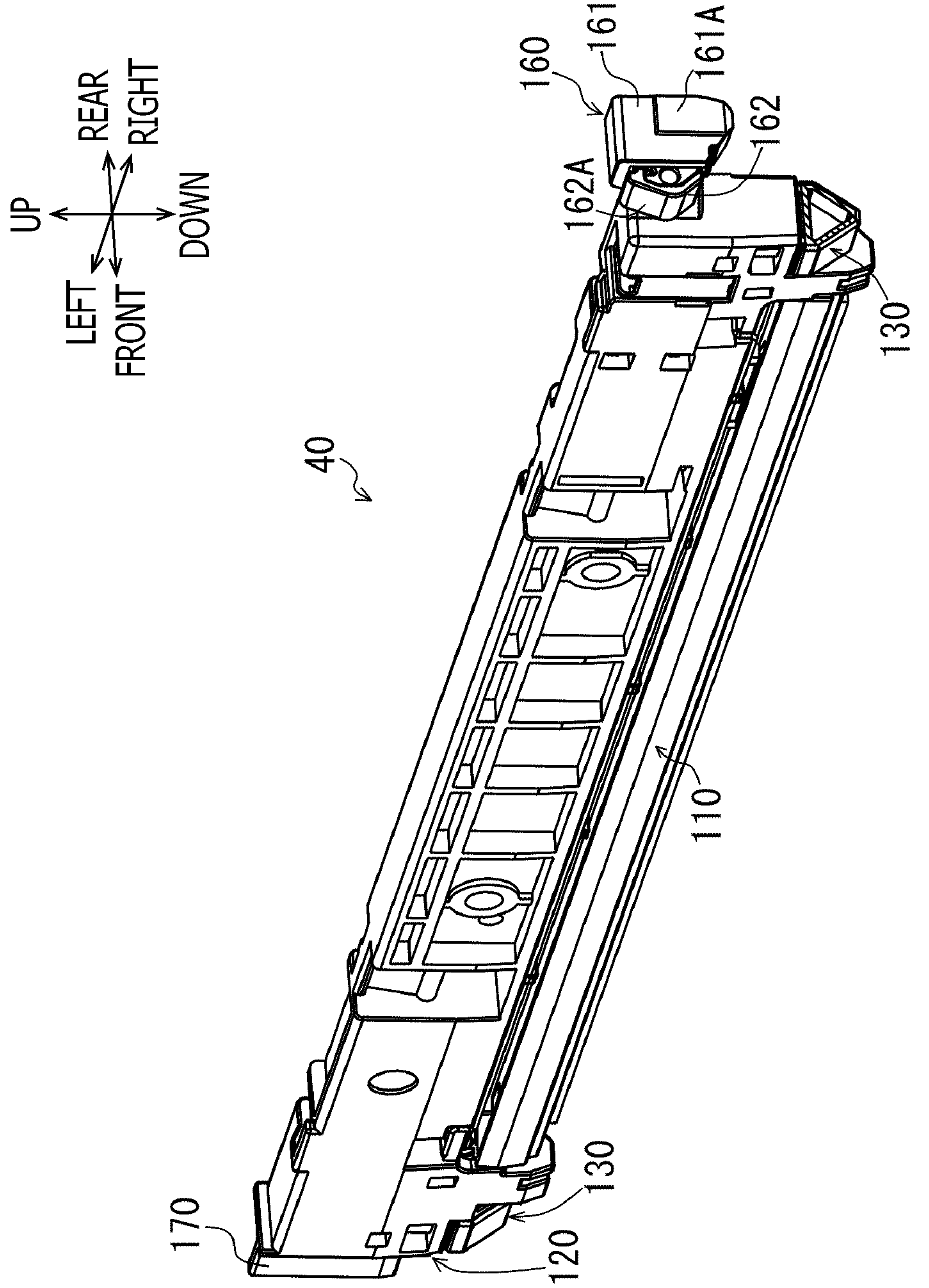
FIG. 3 is a perspective view of the exposure head.

Each exposure head 40 includes, as shown in FIGS. 2 and 3, a first frame 110, a second frame 120, a gap adjuster 130 arranged between the second frame 120 and the drum unit 50, a pressure applier 160, and a rib 170. The gap adjuster 130 may be placed to abut on an end of the drum unit 50 and thereby define a distance between lens arrays 112 and the surface of the photosensitive drum 51.

The first frame 110 and a second frame 120 are made of resin.

The first frame 110 has a base 111, which is in a form of a rectangular box elongated in the widthwise direction. The base 111 is made of resin.

Inside the base 111, a plurality of arrays of LEDs (not shown) are arranged. The LED arrays align in the axial direction. The base 111 has an opening on a lower side, and the lens arrays 112, through which beams from the LED arrays form images on the surface of the photosensitive drum 51, are arranged in the opening.

The LED arrays are semiconductor devices, each having a plurality of light-emitters (LEDs) aligning in the axial direction. The light-emitters may sequentially flash on and off along the axial direction to scan and expose the surface of the photosensitive drum 51 to the light. Lower surfaces of the lens arrays 112 form light-emitting surfaces and face the surface of the photosensitive drum 51.

The direction, in which the LED arrays aligning along the axial direction scan the photosensitive drum 51 along the axial direction, may be herein called a main scanning direction. A direction of optical axes of the beams emitted from the LED arrays, i.e., beams emitted through the lens arrays 112 at the photosensitive drum 51, may be called an optical-axis direction. A direction intersecting orthogonally with the optical-axis direction and the main scanning direction may be called a sub-scanning direction. In the present embodiment, the sub-scanning direction substantially coincides with the direction, in which the process cartridges PC align, and with the front-rear direction.

The second frame 120 supports the first frame 110 and is suspended by a resin holder, which is pivotably supported by the cover 11, downward from the cover 11. The second frame 120 includes a base 121 and two (2) protrusions 125, which are formed integrally. The base 121 has a rectangular form elongated in the widthwise direction. The protrusions 125 protrude downward from widthwise ends of the base 121.

As shown in FIG. 3, the pressure applier 160 is located on one side, e.g., a rightward side, of the second frame 120 in the axial direction. The pressure applier 160 may press the exposure head 40 one way in the sub-scanning direction. The pressure applier 160 includes a base 161, a pressure-applying portion 162, and a spring 163 (see FIG. 8). The pressure applier 160 may be placed in a groove 210 or a groove 210B (see FIG. 6) in the side frame 200 on the right in the main housing 10 and thereby located at a correct position with respect to the main housing 10.

The base 161 has a form of a box and accommodates the spring 163 therein. The base 161 has a protrusion 161A on a sideward face on one end in the axial direction. The pressure-applying portion 162 is located on a front side of the base 161 and is supported by the base 161 movably in the sub-scanning direction. The pressure-applying portion 162 has a slidable surface 162A, which bends into a convex shape in a view along the optical-axis direction. The pressure-applying portion 162 is formed of resin with higher sliding properties such as polyacetal (POM). The pressure-applying portion 162 is urged frontward in the sub-scanning direction by the spring 163 arranged in the base 161.

The protrusion 161A is urged rightward by a spring 122 (see FIG. 2) located inside the second frame 120. In other words, the spring 122 applies a rightward urging force to the protrusion 161A.

Figure 15:
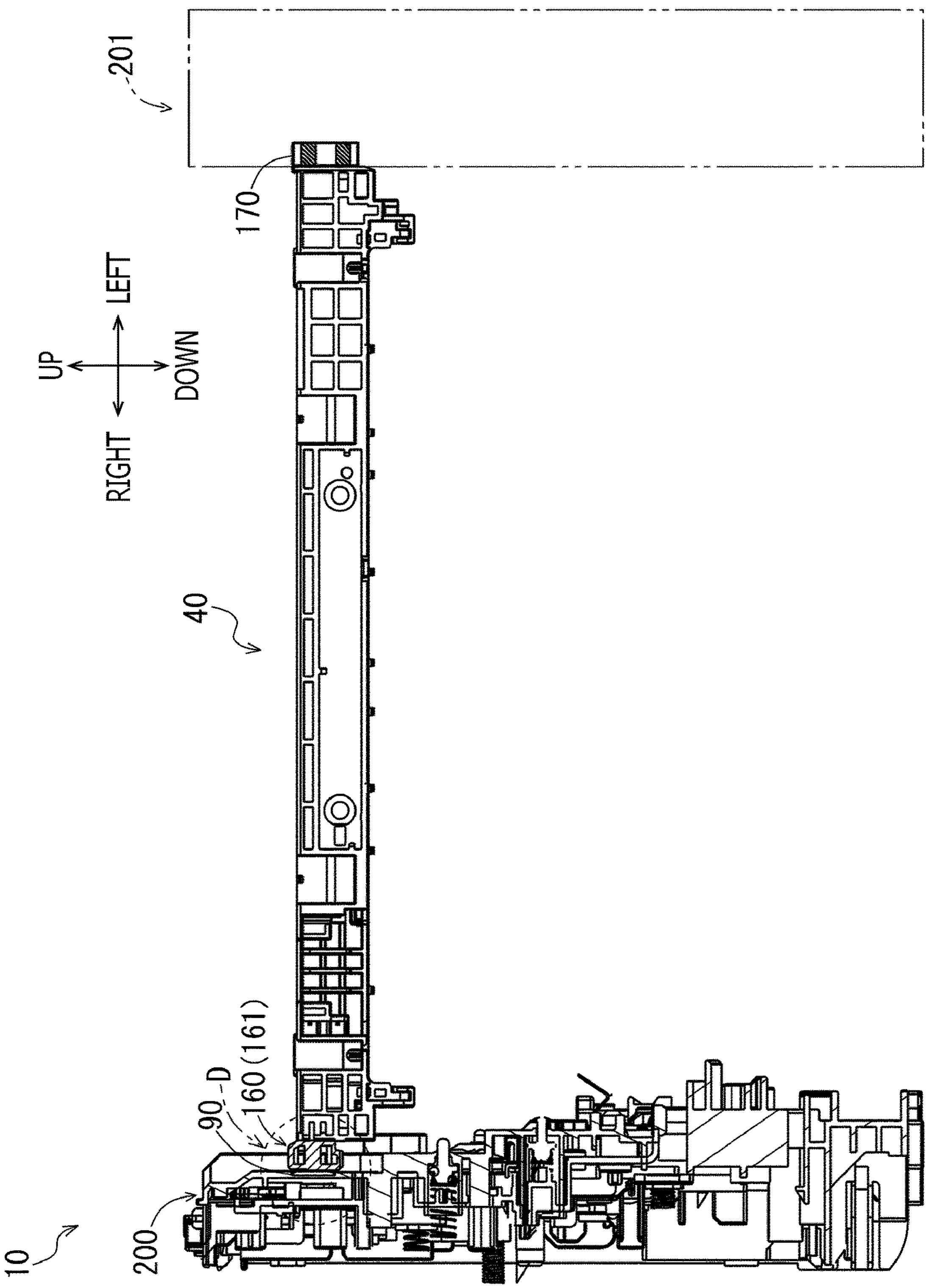
FIG. 15 is a cross-sectional view sectioned at line C-C in FIG. 7.

The rib 170 is located on the other side, e.g., a leftward side, of the second frame 120 in the axial direction. The rib 170 may be placed in a groove formed in the side frame 201 on the left (see FIGS. 2 and 15) in the side frame 201 on the left in the main housing 10 and thereby located at a correct position with respect to the main housing 10. The rib 170 has a form of a plate extending in the optical-axis direction.

Figure 4:
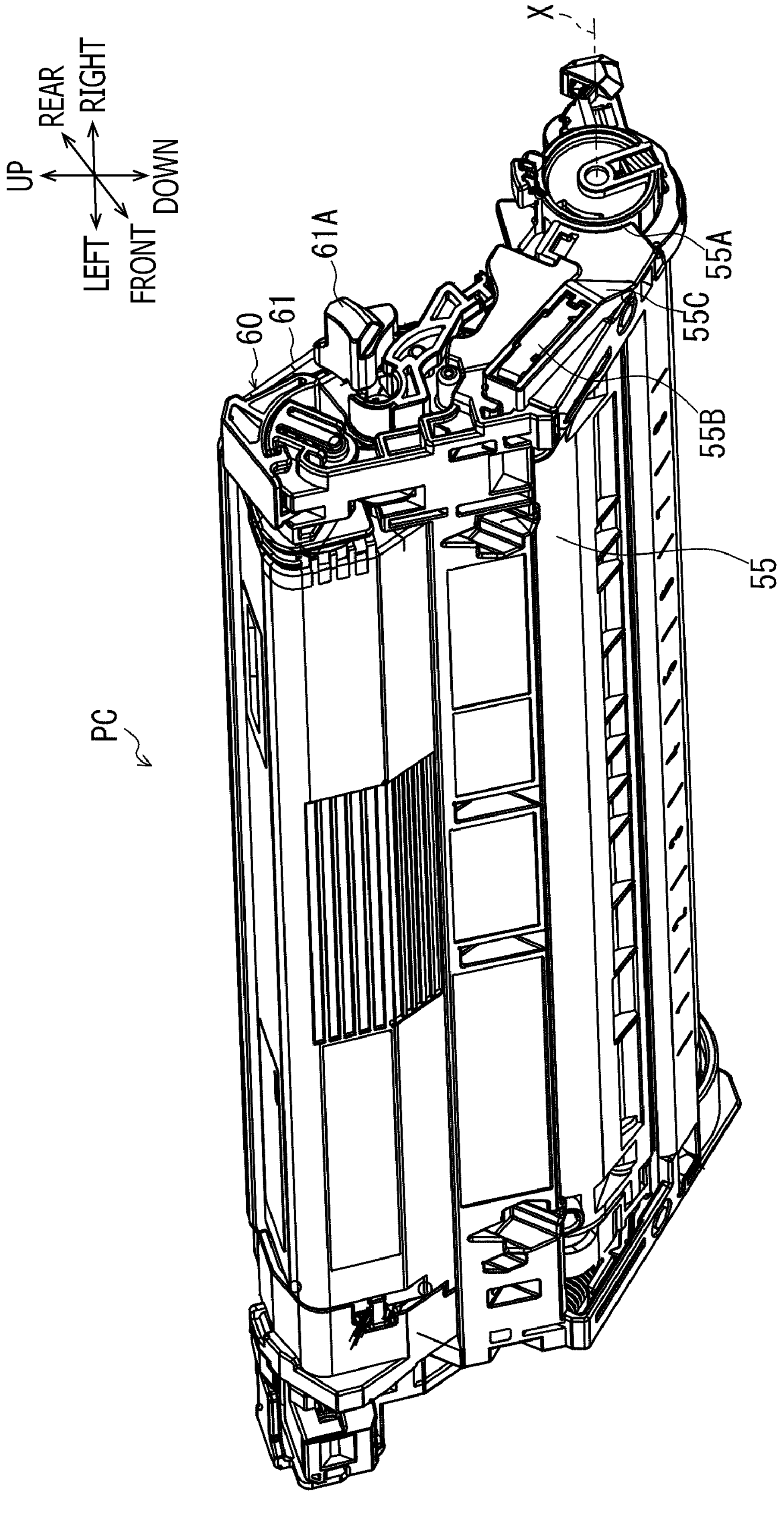
FIG. 4 is a perspective view of the process cartridge.
Figure 5:
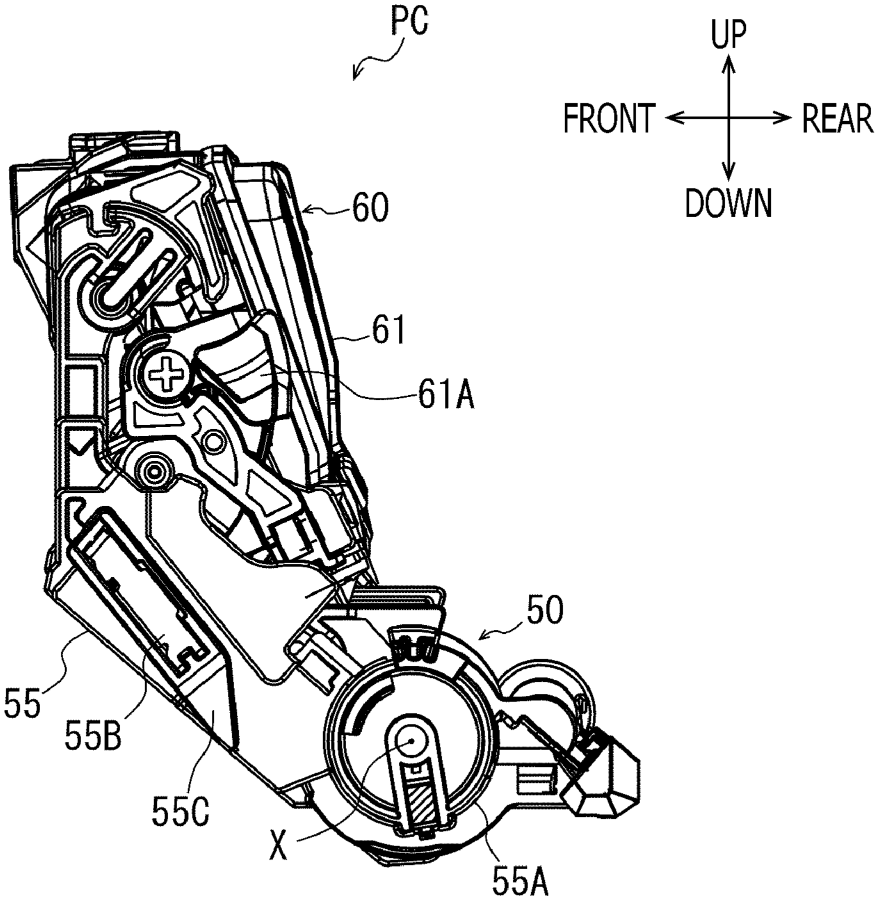
FIG. 5 is a side view of the process cartridge.

As shown in FIGS. 4 and 5, the drum frame 55 has an arc portion 55A and a guided portion 55B. The arc portion 55A is a part of the drum frame 55 that forms an arc extending along a circumference centered on the rotation axis X. The arc portion 55A is arranged on each side of the drum frame 55 in the axial direction.

The guided portion 55B is a part of the drum frame 55 engageable with the groove 210 or a groove 210C (see FIG. 7) in the main housing 10 to guide the drum unit 50 being attached to the main housing 10. The groove 210 branches at an intermediate position to form a groove 220 and may guide the photosensitive drum 51 to move there-along. The guided portion 55B protrudes outward from a side surface on one side, e.g., a rightward surface, of the drum frame 55 in the axial direction.

The guided portion 55B may be in a form of a plate extending in an attaching direction of the drum unit 50. In particular, the guided portion 55B may be tapered to be narrower toward a tip end 55C in the attaching direction. As will be described further below, when the drum unit 50 is attached to the main housing 10, the guided portion 55B may partly contact the groove 210 or 210C to locate the drum unit 50 at a correct position. The position of the drum unit 50 attached to the main housing 10 will be herein called an attached position.

The developing cartridge 60 has a protrusion 61A on a sideward face on the right in the axial direction. The protrusion 61A may move in the groove 220 in the main housing 10 when the process cartridge PC including the developing cartridge 60 is being attached to the main housing 10. The protrusion 61A may locate the process cartridge PC being attached to the main housing 10. The groove 220 may guide the protrusion 61A moving in the main housing 10.

Figure 6:
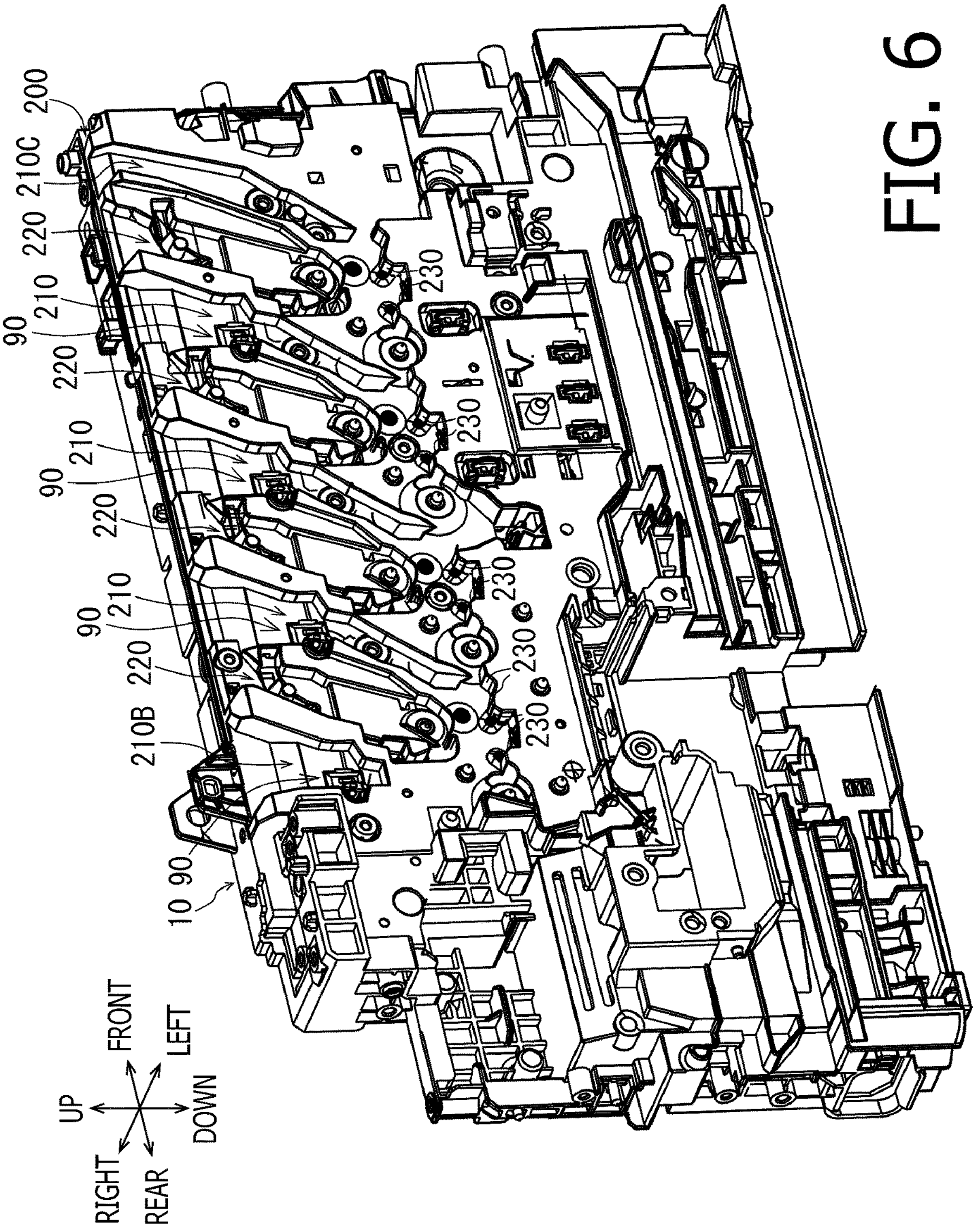
FIG. 6 is a perspective view of an inner side of a main housing of the image forming apparatus.

As shown in FIG. 6, the side frame 200 on the right has two (2) drum-positioning portions 230 for each process cartridge PC.

Figure 7:
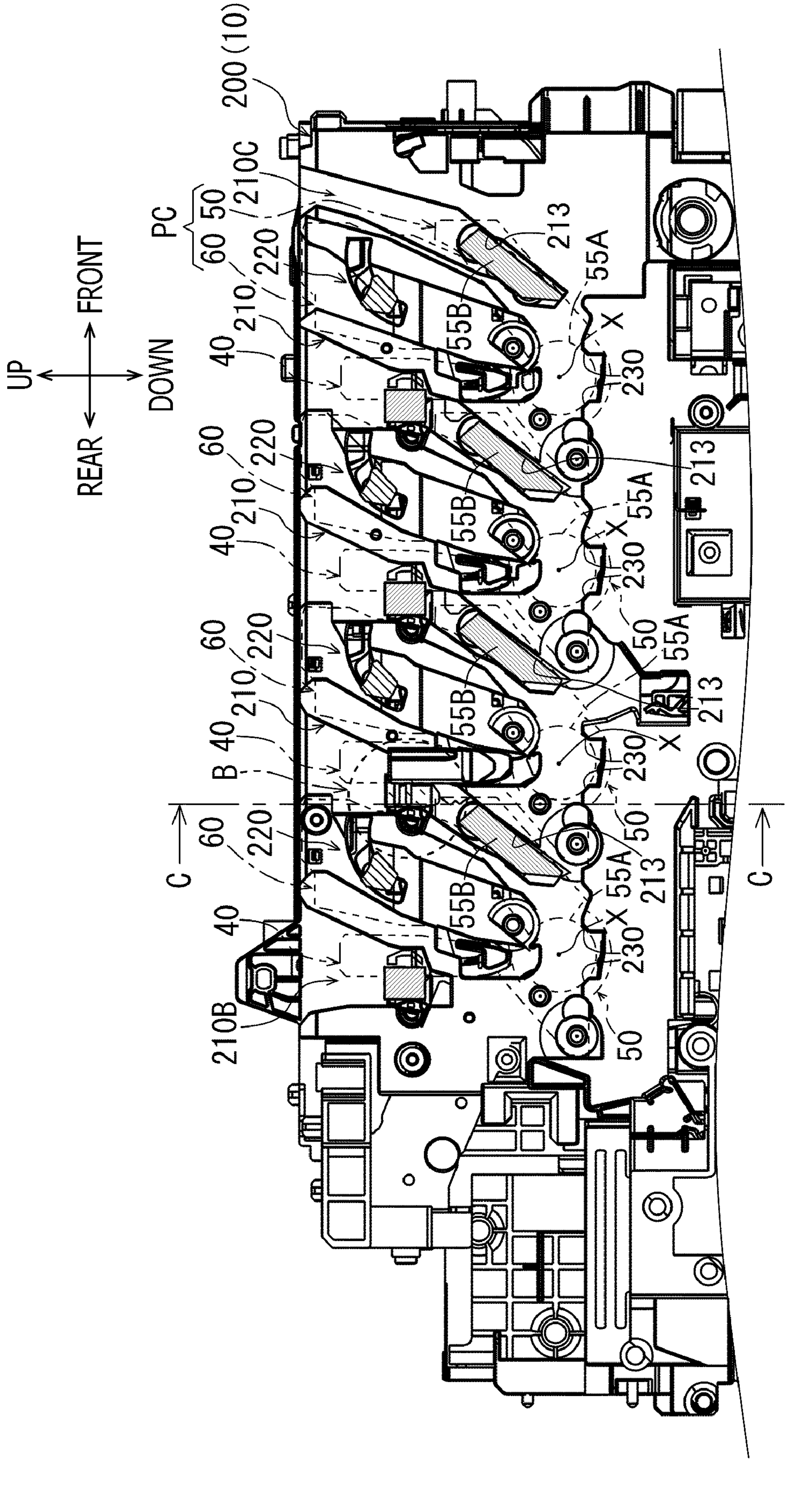
FIG. 7 is an illustrative view of the process cartridges attached to the main housing with the exposure heads being located at exposable positions.

As shown in FIG. 7, the drum-positioning portions 230 are located at positions lower than the rotation axis X of the drum unit 50 attached to the main housing 10. One of the drum-positioning portions 230 is located frontward, and the other of the drum-positioning portions 230 is located rearward, with respect to the rotation axis X. When the drum unit 50 is attached to the main housing 10, the arc portion 55A of the drum frame 55 contacts the drum-positioning portions 230 of the main housing 10 and locate the drum unit 50 at the correct position. The arc portion 55A may, in particular, locate the rotation axis X of the photosensitive drum 51 supported by the drum unit 50 at a correct position.

The four drum units 50 are arranged to align in the front-rear direction, i.e., the sub-scanning direction. The drum units 50 for colors of black, cyan, magenta, and yellow may align in this given order from rear to front. The four exposure heads 40 are arranged to align in the sub-scanning direction at positions corresponding to the four photosensitive drums 51 on one-on-one basis.

The main housing 10 has three (3) grooves 210 and one (1) groove 210C to guide the drum units 50 to be attached to the main housing 10. The grooves 210, 210C are formed on an inner surface of the side frame 200 and extend downward from an upper end of the side frame 200.

The groove 210C is located most rearward among the four grooves 210, 210C and may guide one of the drum units 50 to be attached at a rearmost position among the four drum units 50. The grooves 210 are in a same form and are located frontward from the groove 210C to align in the sub-scanning direction. The grooves 210 may guide the other three of the drum units 50 moving to be attached to the main housing 10.

The three grooves 210 may, not only guide the drum units 50 to be attached to the main housing 10, but also locate the exposure heads 40 at correct positions in the sub-scanning direction when the exposure heads 40 are at the exposable positions. In other words, the grooves 210 may guide attachment of the drum units 50 and locate the exposure heads 40 at the correct positions in the sub-scanning direction when the exposure heads 40 are at the exposable positions.

The grooves 210 and the groove 210C may engage with the guided portions 55B of the drum units 50 and guide the guided portions 55B through the engagement. Each of the grooves 210 and the groove 210C has a frame-positioning surface 213, where a lower side of the guided portion 55B of the drum unit 50 contacts the groove 210, 210C. The frame-positioning surface 213 is a part of a rearward surface in the groove 210, 210C.

The main housing 10 further has a groove 210B to locate a most frontward one of the exposure heads 40 at a correct position in the sub-scanning direction.

Figure 8:
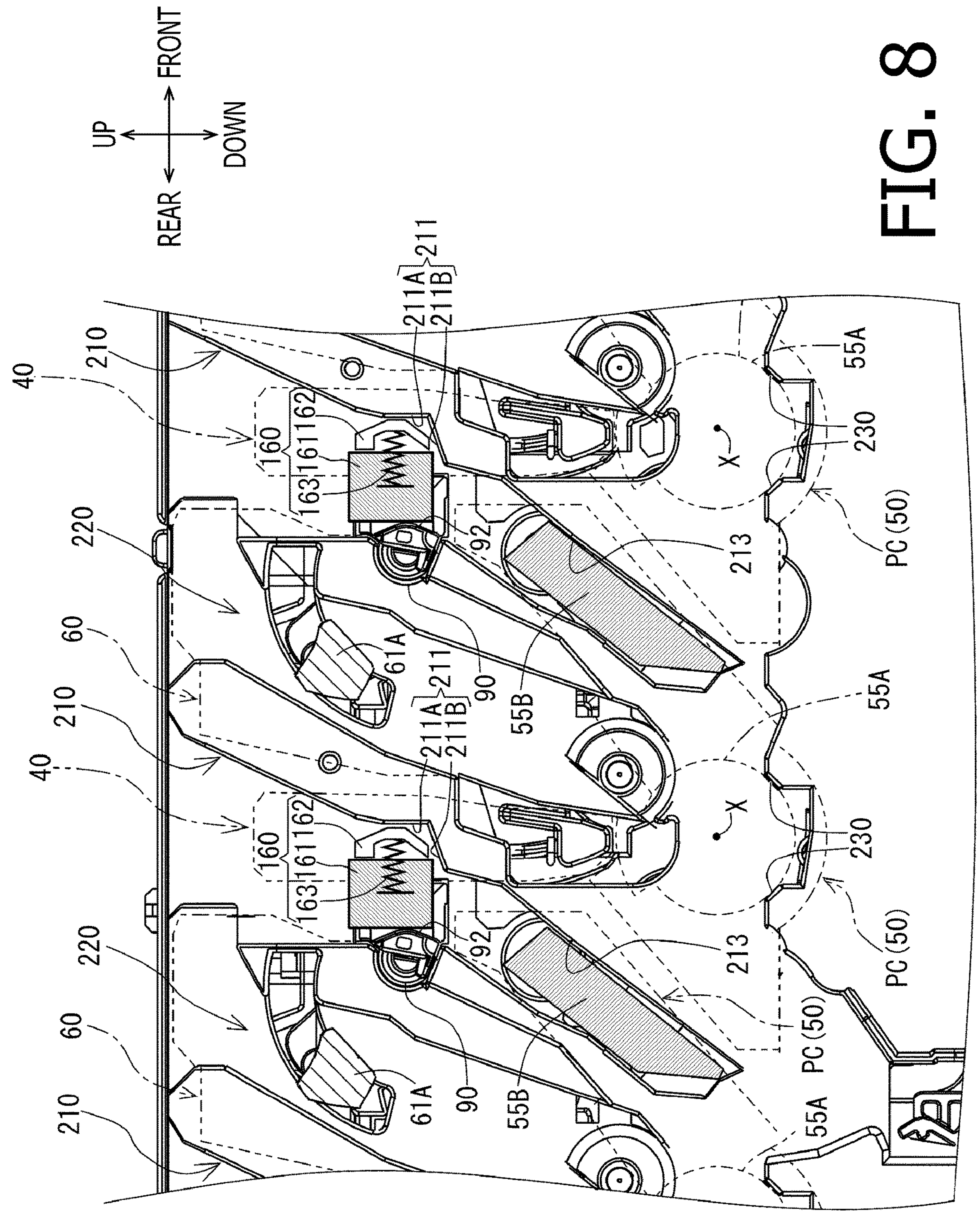
FIG. 8 is a partially enlarged view of FIG. 7.
Figure 9A:
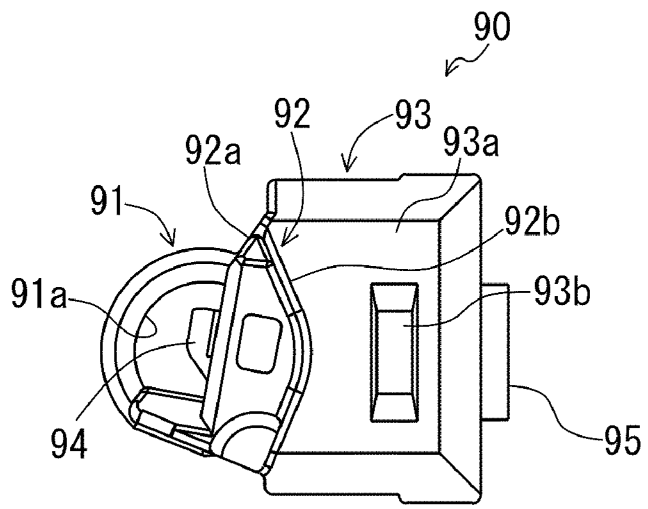
FIGS. 9A-9B are perspective views of a positioning piece.
Figure 9B:
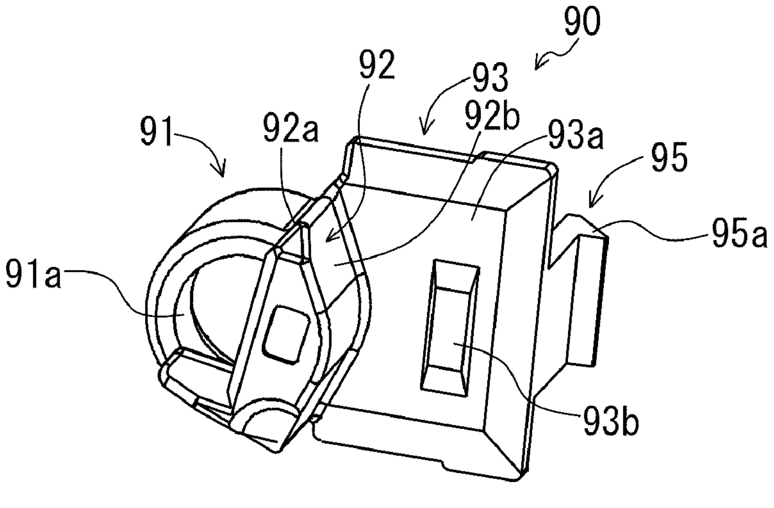

As shown in FIG. 8, each of the grooves 210 and the groove 210B has a dent 211, in which at least a part of the pressure applier 160 may enter, and an arc surface 92 being a part of a positioning piece 90, which will be described further below. The dent 211 has a contact surface 211A extending in the vertical direction and an auxiliary guiding surface 211B extending obliquely downward from a lower end of the contact surface 211A. When the exposure head 40 is located at the exposable position, a part of the pressure-applying portion 162 of the pressure applier 160 may enter the dent 211 and contact the contact surface 211A.

Figure 14:
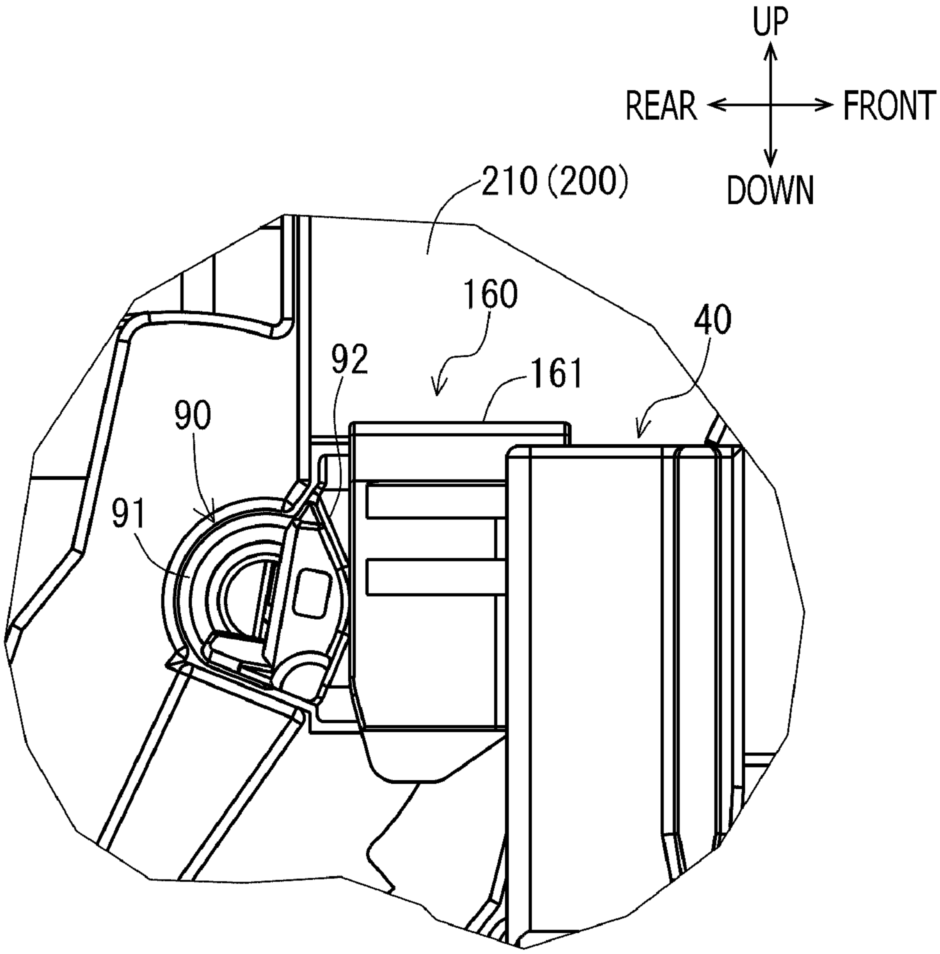
FIG. 14 is an enlarged view of a circled area B in FIG. 7.

The arc surface 92 is a part, at which the base 161 of the exposure head 40 located at the exposable position contacts the groove 210, 210B (see FIG. 14). The main housing 10 has the side frame 200, which forms bodies (parts excluding the positioning pieces 90) of the grooves 210 and the groove 210B, and the positioning pieces 90 including the arc surfaces 92, on which the exposure heads 40 corresponding to the grooves 210 and the groove 210B may be located. The positioning pieces 90 are made of a material with higher sliding properties than the material that form the substantially entirety of the side frame 200. The higher sliding properties in this context means that a friction coefficient against the base 161 is lower.

When the drum unit 50 is attached to the main housing 10 through the groove 210, in a view along the axial direction, the rotation axis X does not overlap the groove 210. Moreover, when the drum unit 50 is attached to the main housing 10 through the groove 210, in a view along the axial direction, the photosensitive drum 51 does not overlap the groove 210. In other words, the photosensitive drums 51 are located deeper down in the main housing 10 than the grooves 210 and are not located thereat directly by the grooves 210 but are located thereat by the arc portions 55A contacting the drum-positioning portions 230.

As shown in FIG. 7, the main housing 10 has four (4) grooves 220, in which the protrusions 61A of the four developing cartridges 60 may move through the main housing 10. The grooves 220 are arranged to align in the sub-scanning direction. In particular, each groove 220 is formed to separate from the groove 210, 210B, or 210C, and is located at one of a position between the groove 210C and the groove 210, a position between the grooves 210, and a position between the groove 210 and the groove 210B.

In the meantime, the side frame 201 on the left in the main housing 10 has grooves that are in different forms from the grooves 210, 210B, 210C, 220 in the side frame 200 on the right. Although a detailed description of the grooves in the side frame 201 on the left is omitted herein, leftward ends of the drum units 50 and the exposure heads 40 are located at the correct positions in the main housing 10 by a structure different from those of the rightward ends.

[Main Housing (Side Frame on the Right)]

Figure 11:
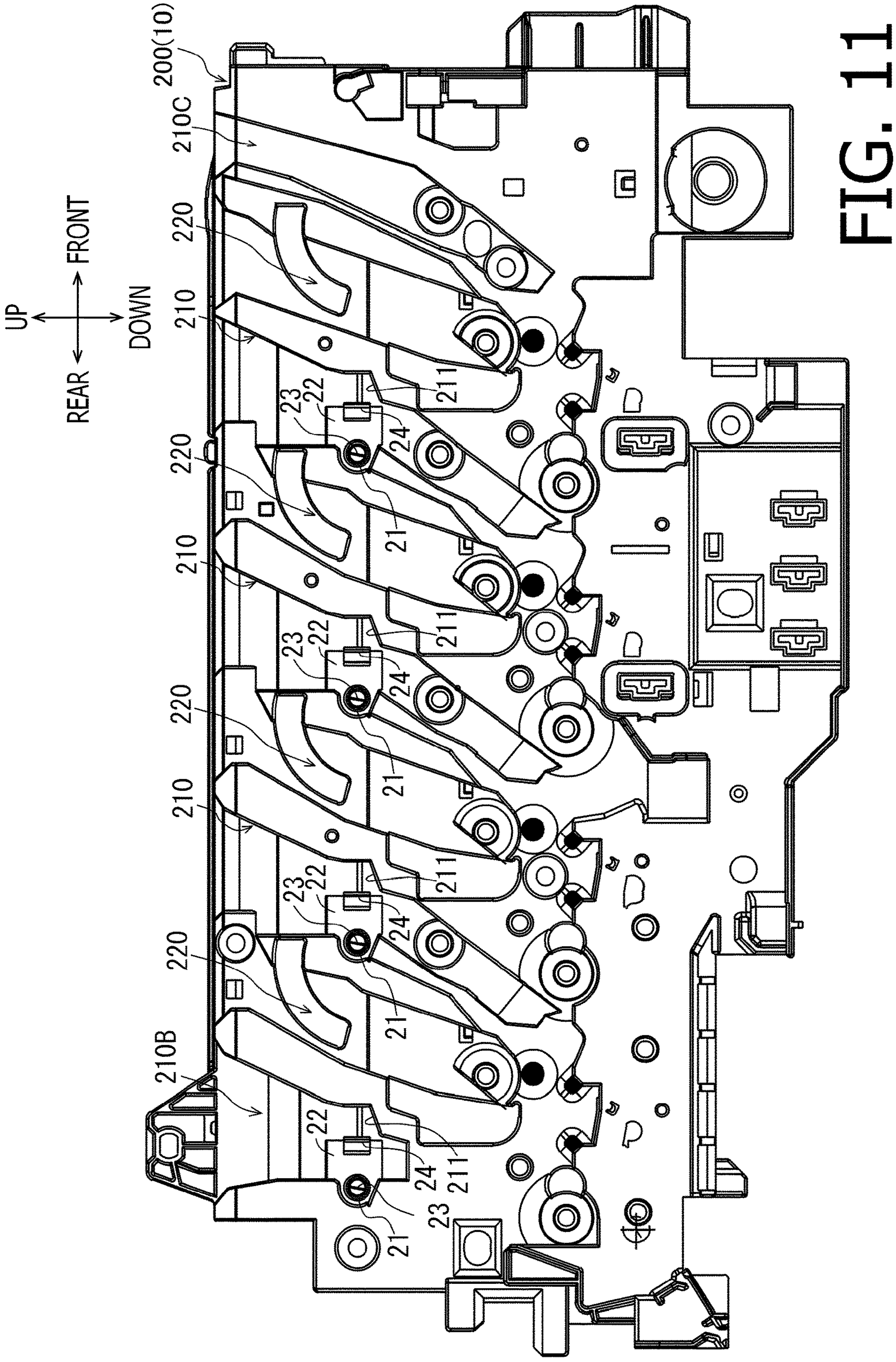
FIG. 11 is a side view of a side frame without the positioning piece being attached thereto.

The side frame 200 on the right and the side frame 201 on the left in the main housing 10 are located apart from each other in the widthwise direction to face each other. As shown in FIG. 11, the side frame 200 on the right has bosses 21, fitting grooves 22, first engageable holes 23, and second engageable holes 24, which are located in intermediate areas in the grooves 210.

The bosses 21 are each located in an intermediate area in the vertical direction in the groove 210. The bosses 21 each have a cylindrical form protruding leftward. The bosses 21 are located at positions to face the dents 211 formed in the grooves 210 in the front-rear direction. The bosses 21 may fit with cylinders 91 in the positioning pieces 90.

The fitting grooves 22 are each located at a position frontward from the boss 21. Each fitting groove 22 is in a substantially rectangular form in a sideward view dented outward in the widthwise direction, i.e., dented in an axial direction of the cylinder 91, and may fit with a plate 93 in the positioning pieces 90. The fitting groove 22 may, with the plate 93 fitted therein, locate the positioning piece 90 at a correct position with respect to the side frame 200.

The engageable holes 23 are each engageable with a first claw 94*a* of a first hook 94, which will be described further below. The engageable holes 23 are formed in the side frame 200 of the main housing 10 at positions corresponding to the first claws 94*a* of the first hooks 94.

The engageable holes 24 are each engageable with a second claw 95*a* of a second hook 95, which will be described further below. The engageable holes 24 are formed in the side frame 200 of the main housing 10 at positions corresponding to the second claws 95*a* of the second hooks 95.

[Positioning Piece]

The positioning piece 90 may locate the exposure head 40 at a correct position with respect to the main housing 10. As shown in FIGS. 9A-9B and 10A-10B, each positioning piece 90 has the cylinder 91, the arc surface 92, the plate 93, the first hook 94, and the second hook 95. The cylinder 91 may fit around the boss 21 formed in the main housing 10. The arc surface 92 is concentric with a circumferential surface of the cylinder 91 and may contact the exposure head 40. The plate 93 extends rearward from the cylinder 91.

The cylinder 91 has a through hole 91*a* formed through in the axial direction, i.e., the widthwise direction. In the through hole 91*a*, the boss 21 in the side frame 200 may be fitted. The arc surface 92 is a part, at which the base 161 of the exposure head 40 located at the exposable position may contact the positioning piece 90. The arc surface 92 is concentric with the circumferential surface of the cylinder 91 and is located over a frontward portion of the cylinder 91 in a sideward view.

According to the configuration described above, when the positioning piece 90 is placed on the side frame 200 of the main housing 10, the arc surface 92 aligns concentrically with the cylinder 91. Therefore, for example, while the positioning piece 90 may rotate around the boss 21 of the main housing 10, positioning accuracy of the exposure head 40 may be maintained.

Figure 16:
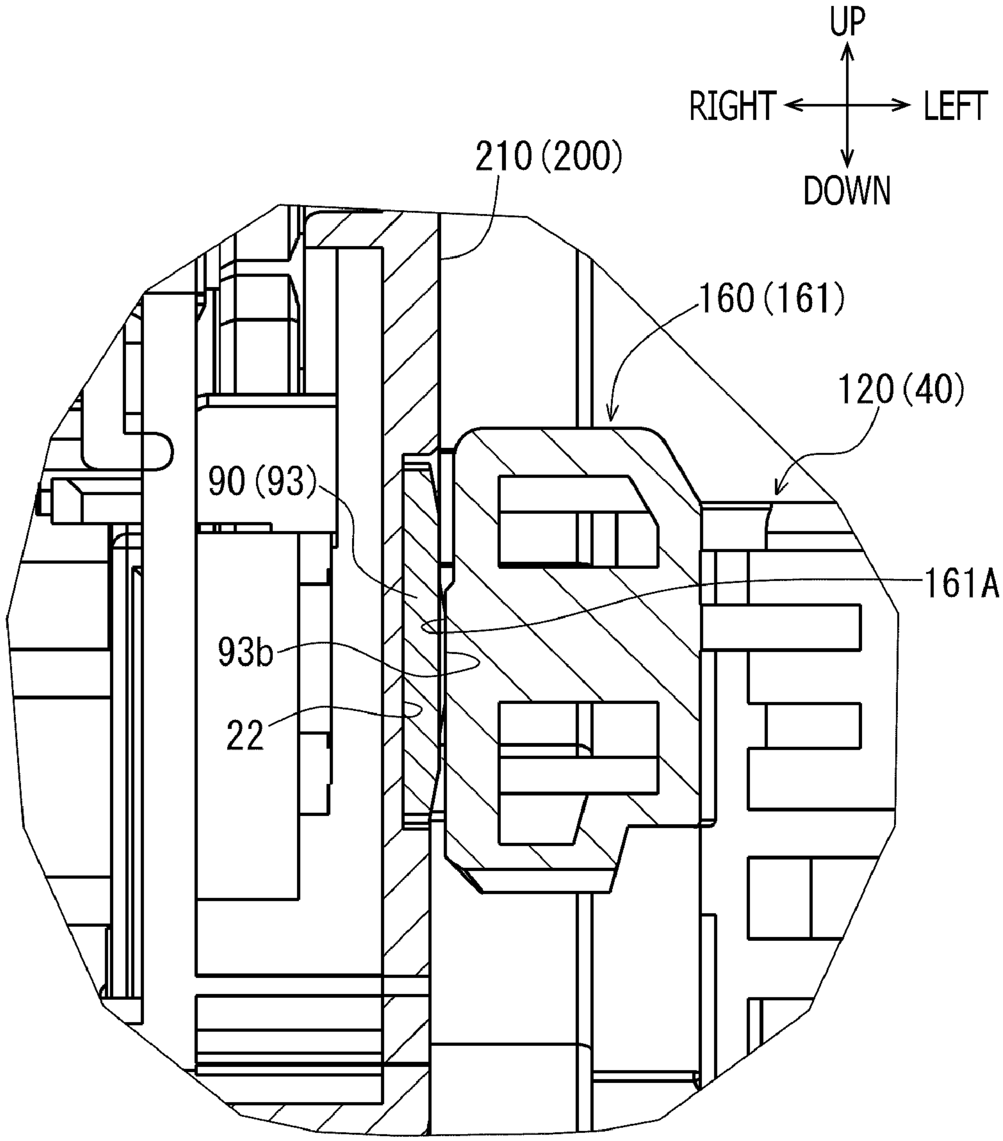
FIG. 16 is an enlarged view of a circled area D in FIG. 15.

The plate 93 has a substantially rectangular form in a sideward view and has a plate body 93*a* having a form of a plate and a pressure-applying surface 93*b* arranged on a surface of the plate body 93*a*. The pressure-applying surface 93*b* protrudes leftward from a leftward surface of the plate body 93*a*. The plate 93 is located on a side of the cylinder 91, on which the arc surface 92 is located, i.e., a rear side of the cylinder 91. In other words, the plate 93 is located on the same side of the cylinder 91 as the arc surface 92. The plate 93 may fit with the fitting groove 22, which is dented in the axial direction of the cylinder 91, in the main housing 10. The pressure-applying surface 93*b* may press the pressure applier 160 of the exposure head 40 at the exposable position inward in the axial direction of the photosensitive drum 51, i.e., leftward (see FIG. 16).

Thus, the plate 93 fitted in the fitting groove 22 in the main housing 10 may restrict the positioning piece 90 from rotating with respect to the boss 21 in the main housing 10. Moreover, with the pressure-applying surface 93*b* pressing the pressure applier 160 in the exposure head 40, the exposure head 40 may be retained stably at the exposable position.

Figure 10A:
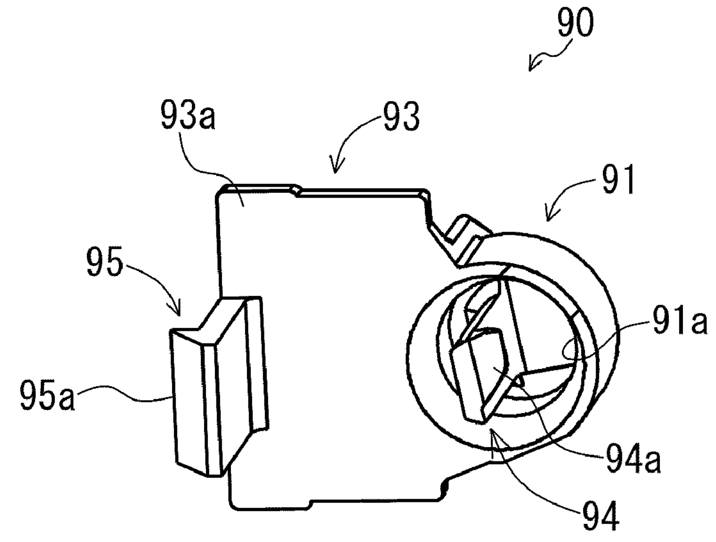
FIGS. 10A-10B are perspective views of the positioning piece.
Figure 10B:
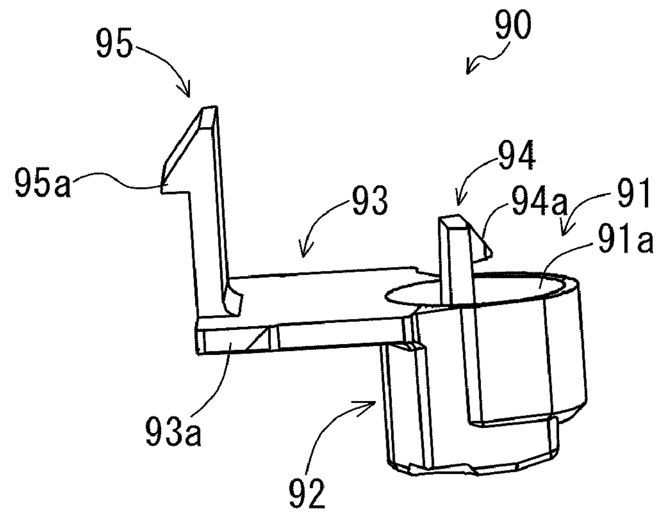

As shown in FIG. 10A, the first hook 94 is formed to extend in the through hole 91*a* in the cylinder 91. The first hook 94 has the first claw 94*a* protruding toward a side opposite to a side of the cylinder 91, on which the arc surface 92 is located, e.g., rearward, in the axial direction of the cylinder 91, to engage with the engageable hole 23 in the main housing 10.

With the first hook 94 extending in the through hole 91*a* of the cylinder 91, compared to an arrangement, in which the first hook 94 is located outside the cylinder 91, a volume of the positioning piece 90 may be reduced.

The second hook 95 extends outward in the widthwise direction from the plate 93 and is located to face the first hook 94. The second hook 95 has the second claw 95*a* protruding toward the same side of the cylinder 91 as the arc surface 92, i.e., frontward, to engage with the engageable hole 24 in the main housing 10. With the first claw 94*a* of the first hook 94 and the second claw 95*a* of the second hook 95 protruding outward to point opposite directions, the engageable hole 23 and the engageable hole 24 may securely engage with the first claw 94*a* and the second claw 95*a*, respectively, and the positioning piece 90 may be restrained from falling off from the main housing 10.

Figure 12:
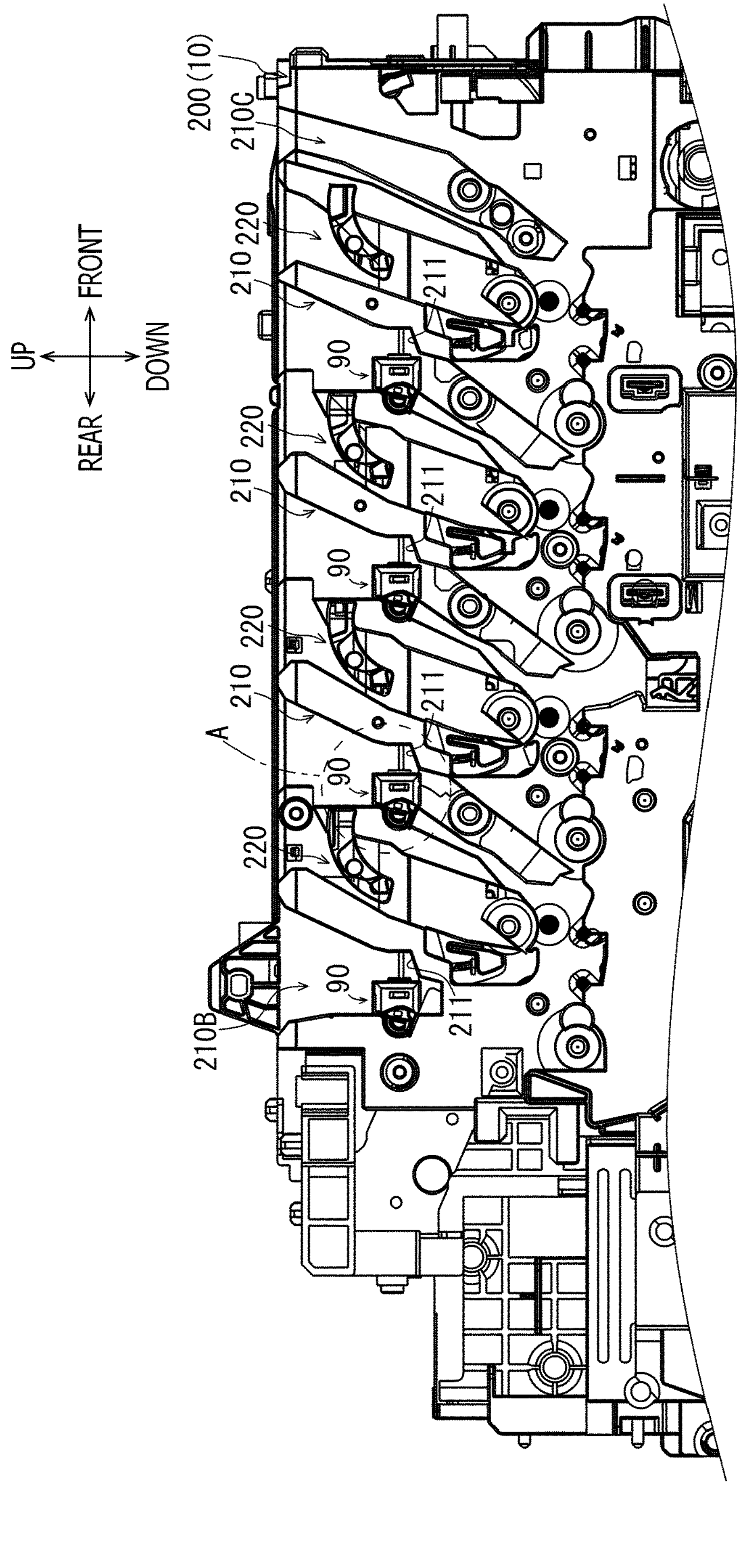
FIG. 12 is a side view of the side frame with the positioning piece being attached thereto.
Figure 13:
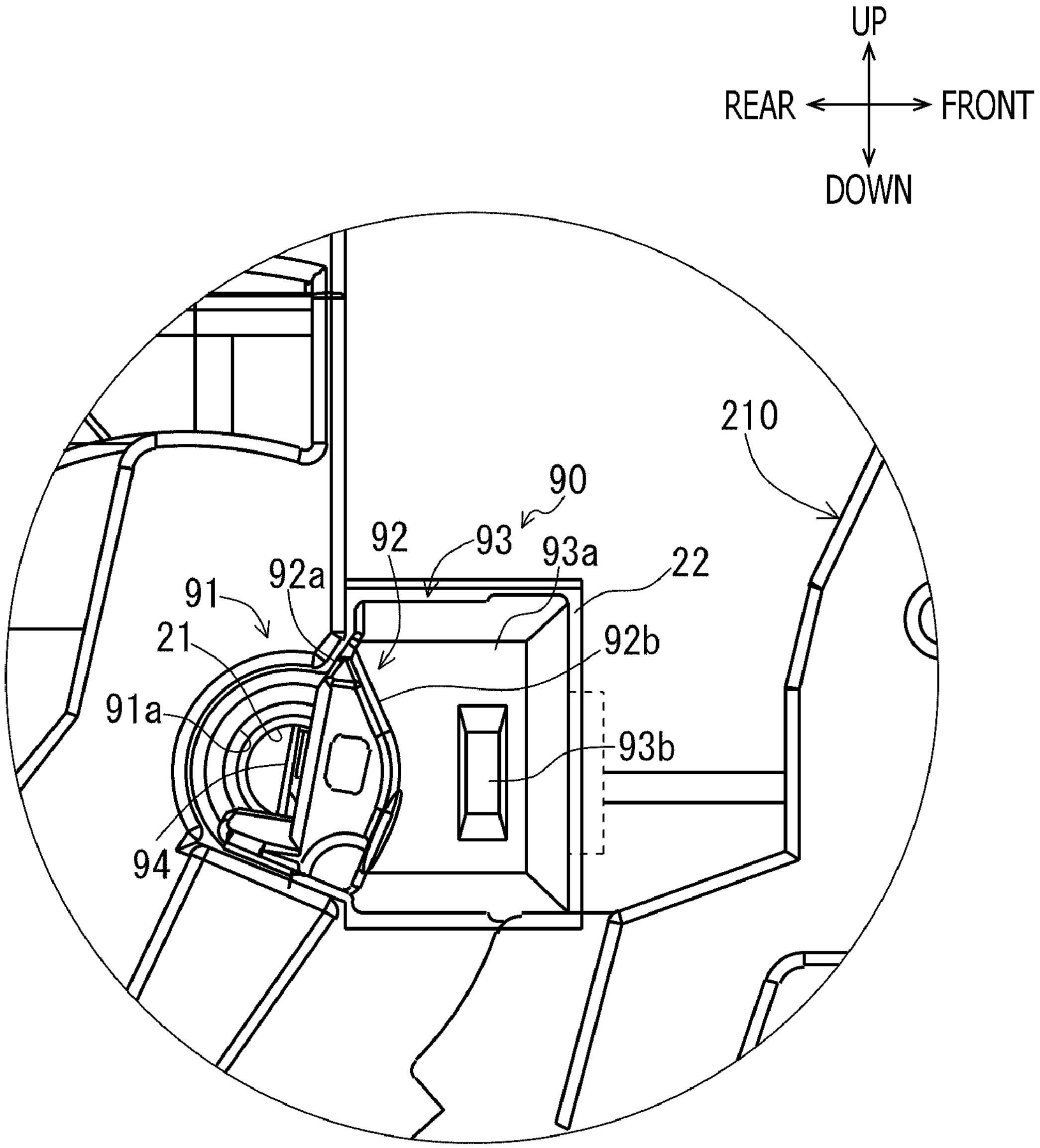
FIG. 13 is an enlarged view of a circled area A in FIG. 12.

The positioning piece 90 may be attached to the side frame 200 in the main housing 10 by placing the boss 21 to fit in the through hole 91*a* in the cylinder 91 and the plate 93 to fit with the fitting groove 22 in the main housing and by placing the first claw 94*a* of the first hook 94 to engage with the engageable hole 23 in the main housing 10 and the second claw 95*a* of the second hook 95 to engage with the engageable hole 24 in the main housing 10 (see FIGS. 12 and 13).

Moreover, the arc surface 92 has a first guiding surface 92*a* to guide the protrusion 61A of the developing cartridge 60 to the groove 220 and a second guiding surface 92*b* to guide the photosensitive drum 51 to the groove 210. Therefore, the protrusion 61A and the photosensitive drum 51 may be guided in the groove 220 and the groove 210, respectively, by the single arc surface 92. Accordingly, the volume of the positioning piece 90 may be reduced.

The positioning pieces 90 are formed separately from the side frame 200 of the main housing 10. The side frame 200 may be made of acrylic nitrile butadiene styrene (ABS) resin. The positioning pieces 90 may be made of resin with higher sliding properties than the main housing 10 such as, for example, polyoxymethylene (POM). The positioning pieces 90 may be made of a material having a lower friction coefficient than the side frame 200.

With the positioning pieces 90 formed of the material having the higher sliding properties than the side frame 200 in the main housing 10, when the exposure heads 40 contact the positioning pieces 90, the exposure heads 40 may be moved to the exposable positions smoothly.

Meanwhile, it may be preferable that the positioning pieces 90 are formed in resin having higher sliding properties than the ABS resin. Optionally, the positioning pieces 90 may be formed in resin other than POM.

Moreover, it may be preferable that a radius of curvature of the arc surface 92 is greater than a radius of curvature of the cylinder 91.

In this arrangement, the exposure heads 40 may be guided to the exposable positions smoothly.

According to the image forming apparatus 1 described above, for attaching each process cartridge PC to the main housing 10, the guided portion 55B in the drum unit 50 may be inserted in either the groove 210 or the groove 210C. Accordingly, an overall posture of the process cartridge PC may be regulated by the groove 210 or the groove 210C. As the process cartridge PC is lowered further, the protrusion 61A of the developing cartridge 60 in the process cartridge PC may be guided to the groove 220 along the first guiding surface 92A of the positioning piece 90, and the photosensitive drum 51 may be guided in the groove 210 by the second guiding surface 92*b*. As the process cartridge PC is lowered further to a maximum extent, the arc portion 55A of the drum unit 50 may contact the paired drum-positioning portions 230 to be supported by the drum-positioning portions 230, and the photosensitive drum 51 and the rotation axis X may be located at the predetermined correct positions.

As the lower surface of the guided portion 55B contacts the frame-positioning surface 213, the drum frame 55 may settle in a predetermined posture. While the drum unit 50 is located at the attached position, the protrusion 61A of the developing cartridge 60 may not contact but may be separated from surfaces of the groove 220 located frontward and rearward of the protrusion 61A. In other words, when the drum unit 50 is located at the attached position, the groove 220 may prevent the protrusion 61A from colliding with the side frame 200.

After the process cartridges PC are all attached to the main housing 10, the cover 11 may be closed. As the cover 11 is being closed, the pressure appliers 160 in the exposure heads 40 may be inserted in either the grooves 210 and the groove 210B. The pressure appliers 160 may move downward in the grooves 210 and the groove 210B. When the cover 11 is closed completely, as shown in FIG. 8, the bases 161 in the pressure appliers 160 may contact the arc surfaces 92 of the positioning pieces 90, and the pressure-applying portions 162 may contact the contact surfaces 211A.

In this arrangement, the pressure-applying portions 162 are urged by the springs 163 against the contact surfaces 211A. Therefore, the bases 161 may contact the arc surfaces 92 stably, and the exposure heads 40 may be located at the predetermined correct positions in the sub-scanning direction. Meanwhile, substantially simultaneously, the protrusions 161A in the pressure appliers 160 may contact the pressure-applying surfaces 93*b* of the positioning pieces 90. In this arrangement, the protrusions 161A may be urged by the springs 122 against the pressure-applying surfaces 93*b*. Therefore, the protrusions 161A may contact the pressure-applying surfaces 93*b* of the positioning pieces 90 stably, and the exposure heads 40 may be located at the predetermined correct positions in the widthwise direction.

While the invention has been described in conjunction with the example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

For example, the number of the process cartridges PC and the exposure heads 40 in the image forming apparatus 1 may not necessarily be limited to four but may be one. In other words, the image forming apparatus 1 may not necessarily be a multicolor laser printer but may be a monochrome laser printer. When the image forming apparatus 1 is a monochrome laser printer, the side frame 200 may not have three (3) grooves 210 or four (4) grooves 220 but may have solely one groove 210 and one groove 220, and the groove 210C may be omitted. In this arrangement, the number of the bosses 21 may be one, equally to the number of the groove 210, and the number of the positioning pieces 90 may be one, equally to the number of the exposure head 40.

For another example, the number of the process cartridges PC and the exposure heads 40 in the image forming apparatus 1 may not necessarily be limited to four but may be two, three, five, or more. In these arrangements, the number of the bosses 21 and the number of the positioning pieces 90 may be two, three, five, or more, equally to the number of the process cartridges PC and the exposure heads 40.

What is claimed is:

1. An image forming apparatus, comprising:

a housing having a boss;

a photosensitive drum configured to be accommodated in the housing, an exposure head configured to expose the photosensitive drum, the exposure head being movable between an exposable position, at which the exposure head exposes the photosensitive drum, and a retracted position, at which the exposure head is separated farther from the photosensitive drum than the exposable position; and a positioning piece for locating the exposure head at a predetermined position in the housing, the positioning piece having:

a cylinder fitted around the boss; and an arc surface extending concentrically with a circumferential surface of the cylinder, the arc surface being configured to contact the exposure head, wherein an axial center of the surface coinsides with an axial center of the cylinder.

2. An image forming apparatus, comprising:

a housing having a boss;

a photosensitive drum configured to be accommodated in the housing, an exposure head configured to expose the photosensitive drum, the exposure head being movable between an exposable position, at which the exposure head exposes the photosensitive drum, and a retracted position, at which the exposure head is separated farther from the photosensitive drum than the exposable position, and a positioning piece for locating the exposure head at a predetermined position in the housing, the position piece having, a cylinder fitted around the boss, and an arc surface extending concentrically with a circumferential surface of the cylinder, the arc surface being configured to contact the exposure head, wherein the positioning piece has a plate extending from the cylinder, and wherein the housing has a groove dented in an axial direction of the cylinder, the groove having the plate fitted therein.

3. The image forming apparatus according to claim 2, wherein the cylinder has a through hole, and the positioning piece has a first hook extending in the through hole through the cylinder, the first hook having a first claw protruding opposite to a side of the cylinder, on which the arc surface is located, the first claw engaging with the housing.

4. The image forming apparatus according to claim 3, wherein the plate is located on the same side of the cylinder as the arc surface, and the positioning piece has a second hook extending from the plate, the second hook being located to face the first hook, the second hook having a second claw protruding toward the same side of the cylinder as the arc surface, the second claw engaging with the housing.

5. The image forming apparatus according to claim 2, wherein the plate has a pressure-applying surface, the pressure-applying surface being configured to press the exposure head located at the exposable position inward in an axial direction of the photosensitive drum.

6. The image forming apparatus according to claim 2, further comprising a drum cartridge detachably attached to the housing, wherein the drum cartridge has the photosensitive drum.

7. The image forming apparatus according to claim 6, wherein the drum cartridge has a positioning rib configured to locate the drum cartridge attached to the housing at a predetermined position in the housing, the housing has a first groove for guiding the positioning rib moving in the housing and a second groove for guiding the photosensitive drum moving in the housing, the second groove being branched off from the first groove at an intermediate position in the first groove, and the arc surface has a first guiding surface for guiding the positioning rib to the second groove and a second guiding surface for guiding the photosensitive drum to the second groove.

8. The image forming apparatus according to claim 2, wherein the positioning piece is formed of a material having higher sliding properties than the housing.

9. The image forming apparatus according to claim 2, wherein a radius of curvature of the arc surface is greater than a radius of curvature of the cylinder.

10. The image forming apparatus according to claim 2, wherein the exposure head has LEDs at a tip end thereof.

* * * * *